United States Patent
Wiberg et al.

(10) Patent No.: US 10,848,217 B2
(45) Date of Patent: Nov. 24, 2020

(54) NETWORK NODE AND A WIRELESS COMMUNICATION DEVICE FOR RANDOM ACCESS IN BEAM-BASED SYSTEMS

(71) Applicant: Telefonaktiebolaget LM Ericsson (publ), Stockholm (SE)

(72) Inventors: Niclas Wiberg, Linköping (SE); Håkan Andersson, Linköping (SE); Johan Furuskog, Stockholm (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 15/747,386

(22) PCT Filed: Oct. 30, 2017

(86) PCT No.: PCT/SE2017/051061
§ 371 (c)(1),
(2) Date: Jan. 24, 2018

(87) PCT Pub. No.: WO2018/084775
PCT Pub. Date: May 11, 2018

(65) Prior Publication Data
US 2018/0367200 A1  Dec. 20, 2018

Related U.S. Application Data

(60) Provisional application No. 62/416,190, filed on Nov. 2, 2016.

(51) Int. Cl.
*H04B 7/06* (2006.01)
*H04W 74/04* (2009.01)
(Continued)

(52) U.S. Cl.
CPC ......... *H04B 7/0617* (2013.01); *H04W 16/28* (2013.01); *H04W 56/001* (2013.01);
(Continued)

(58) Field of Classification Search
CPC ............ H04B 7/0617; H04W 74/0866; H04W 56/001; H04W 16/28; H04W 74/0833; H04W 74/04; H04W 28/04
See application file for complete search history.

(56) References Cited

U.S. PATENT DOCUMENTS

| 2013/0242730 A1* | 9/2013 | Pelletier ............ H04W 28/0284 370/230 |
| 2015/0003418 A1* | 1/2015 | Rosa .................... H04L 5/0035 370/331 |

(Continued)

FOREIGN PATENT DOCUMENTS

WO    2016127403 A1    8/2016

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0, Jun. 2013, 1-108.
(Continued)

*Primary Examiner* — Andrew Lai
*Assistant Examiner* — Chuong M Nguyen
(74) *Attorney, Agent, or Firm* — Murphy, Bilak & Homiller, PLLC

(57) ABSTRACT

Embodiments herein relate to a method performed by a wireless communication device 615, for performing random access. The wireless communication device 615 is configured with a first Random-Access (RA) configuration. The method comprises obtaining an indication of a failure of a beam-tracking process. The method further comprises
(Continued)

adapting the RA configuration of the wireless communication device 615 based on the obtained indication, wherein the adapting comprises switching from the first RA configuration to a second RA configuration having more frequently occurring RA resources than the first RA configuration. The method further comprises transmitting, to a network node 611, 612, a RA message using a RA resource, which RA resource is based on the adapted RA configuration. Embodiments herein further relate to a method performed by a serving network node 611, as well as a wireless communication device 615 and a serving network node 611 for performing the methods.

20 Claims, 12 Drawing Sheets

(51) Int. Cl.
*H04W 74/08* (2009.01)
*H04W 56/00* (2009.01)
*H04W 16/28* (2009.01)
*H04W 28/04* (2009.01)

(52) U.S. Cl.
CPC ....... *H04W 74/04* (2013.01); *H04W 74/0833* (2013.01); *H04W 74/0866* (2013.01); *H04W 28/04* (2013.01)

(56) References Cited

U.S. PATENT DOCUMENTS

| | | | |
|---|---|---|---|
| 2015/0146692 A1* | 5/2015 | Yi | H04W 36/24 370/331 |
| 2016/0099763 A1* | 4/2016 | Chen | H04B 7/0617 370/329 |
| 2016/0183234 A1* | 6/2016 | Sung | H04W 72/046 370/329 |
| 2016/0294462 A1* | 10/2016 | Jeong | H04B 10/29 |
| 2016/0353510 A1* | 12/2016 | Zhang | H04B 7/0617 |
| 2017/0207843 A1* | 7/2017 | Jung | H04W 74/004 |
| 2017/0231011 A1* | 8/2017 | Park | H04W 74/006 |
| 2017/0251460 A1* | 8/2017 | Agiwal | H04W 72/0406 |
| 2018/0006770 A1* | 1/2018 | Guo | H04L 1/1835 |
| 2018/0255468 A1* | 9/2018 | Huang | H04W 72/0413 |
| 2018/0368005 A1* | 12/2018 | Fukui | H04W 16/28 |

OTHER PUBLICATIONS

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.3.0, Jun. 2013, 1-176.

Unknown, Author, "Beamformed Random Access in NR", ZTE, 3GPP TSG RAN WG1 Meeting #86, R1-166419, Gothenburg, Sweden, Aug. 22-26, 2016, 1-8.

Unknown, Author, "Further details on NR 4-step RA Procedure", CATT, 3GPP TSG RAN WG1 Meeting #88, R1-1702066, Athens, Greece, Feb. 13-17, 2017, 1-6.

Unknown, Author, "RA procedure with and without beam correspondence", Samsung, 3GPP TSG RAN WG1 #87, Rt-1612466, Reno, USA, Nov. 14-18, 2016, 1-5.

Unknown, Author, "Random access aspects for beam-based NR initial access", InterDigital Communications, 3GPP TSG-RAN WGI #86bis, R1-1610320, Lisbon, Portugal, 1-5, Oct. 10-14, 2016.

* cited by examiner

NETWORK NODE AND A WIRELESS COMMUNICATION DEVICE FOR RANDOM ACCESS IN BEAM-BASED SYSTEMS

TECHNICAL FIELD

Embodiments herein relate to a network node, a wireless communication device, and methods therein. In particular they relate to random access in a beam-based wireless communications network.

BACKGROUND

Wireless communication devices such as terminals are also known as e.g. User Equipments (UE), mobile terminals, wireless terminals and/or mobile stations. These terms will be used interchangeably hereafter.

Wireless communication devices are enabled to communicate wirelessly in a wireless or cellular communications network or a wireless communication system, sometimes also referred to as a cellular radio system or a cellular network. The communication may be performed e.g. between two wireless communications devices, between a wireless communications device and a regular telephone and/or between a wireless communications device and a server via a Radio-Access Network (RAN) and possibly one or more core networks, comprised within the wireless communications network.

Access network nodes, also referred to as access nodes, such as base stations, communicate over the air interface operating on radio frequencies with the wireless communication devices within range of the access network nodes. In the context of this disclosure, the expression Downlink (DL) is used for the transmission path from the access network node to the wireless communication devices. The expression Uplink (UL) is used for the transmission path in the opposite direction i.e. from the wireless communication devices to the access network node.

Further, each access network node may support one or several communications technologies or radio interfaces also referred to as Radio-Access Technologies (RAT). Examples of wireless communication technologies are New Radio (NR), Long-Term Evolution (LTE), Universal Mobile Telecommunications System (UMTS) and Global System for Mobile communications (GSM).

In a forum known as the Third Generation Partnership Project (3GPP), telecommunications suppliers propose and agree upon standards for networks and investigate enhanced data rate and radio capacity.

Beamforming

With the emerging 5G technologies, the use of many transmit- and receive-antenna elements is of great interest as it makes it possible to utilize transmit- and receive beamforming. Transmit-side beamforming means that the transmitter may amplify a transmitted signal in a selected direction or directions while suppressing the transmitted signal in other directions. Similarly, on the receive side, a receiver may amplify signals from a selected direction (or directions) while suppressing unwanted signals from other directions.

Beamforming allows the signal to be stronger for an individual connection as compared to the case when no beamforming is employed. On the transmit side this is achieved by the concentration of the transmitted power in the desired direction(s), and on the receive side by the increased receiver sensitivity in the desired direction(s). This enhances throughput and coverage of the connection compared with if beamforming is not applied. It also allows reducing the interference from unwanted signals, thereby enabling several simultaneous transmissions over multiple individual connections using the same resources in the time-frequency grid, so-called multi-user Multiple-Input Multiple-Output (MIMO).

Although most commonly described in the setting of the base station such as an eNB, beamforming is not restricted to the eNB. It may also be implemented as Rx- and Tx-side beamforming in the User Equipment (UE), further enhancing the transmitted/received signal and suppressing interfering signals. However, the smaller physical size of a typical UE compared to the eNB makes larger antenna arrays impractical at the UE. An additional complicating factor for utilizing beamforming at the UE-side is the fact that the UE may not be stationary but rather moves around, sometimes at high speed.

Random Access in a Beamforming Setting

A simplified method performed by a UE for random access is illustrated by the flow diagram of FIG. 1. When gaining access to a network, a UE starts by receiving downlink synchronization signals from the eNB and then synchronizing to these downlink synchronization signals. As an example, in LTE, the UE starts by detecting the Primary Synchronization Signal (PSS) after which the UE will have a subframe synchronization, OFDM symbol synchronization, and know the cell identity within the cell ID group. Having subframe synchronization may comprise that the UE has knowledge of when a subframe starts in DL transmissions. Having OFDM-symbol synchronization may comprise that the UE has knowledge of when an OFDM symbol starts in DL transmissions. Then the UE detects Secondary Synchronization Signal (SSS), after which the UE is frame synchronized and knows the cell ID.

The UE may then be configured by receiving and detecting system information carried by a broadcast signal. In LTE, this broadcast information is carried by the Physical Broadcast Channel (PBCH) and by the Physical Downlink Shared Channel (PDSCH) carrying the Broadcast Control Channel (BCCH). This broadcast information may relate to time and frequency allocations of the Physical Random-Access Channel (PRACH), such that the UE knows when and where it is allowed to transmit PRACH preambles. A PRACH preamble is a signalling sequence transmitted in the time/frequency resource designated for random access, which is defined in the applicable standard, and which the network constantly tries to detect. FIG. 2 illustrates a TDD system according to prior art, e.g. as proposed for future 5G standards, where the UE may transmit on the PRACH in subframe 5, which in this TDD system is a fixed allocation for UL transmissions. Also, the UE may be configured with timing information of when within a subframe it may transmit the preamble. This configuration may be implemented by broadcast information over a broadcast channel, or the UE may be preconfigured with the timing information of when within the subframe it may transmit the preamble. The UE then transmits the preamble on the PRACH. The corresponding procedure, illustrated in FIG. 3, in the eNB comprises transmitting downlink synchronization signals, transmitting the configuration as broadcast information over the broadcast channel, and receiving the preamble on the PRACH.

Once a UE has acquired synchronization to a network and determined the allowable PRACH resources it is ready to actually access the network. For this, the random-access procedure is a key procedure. For example, in LTE, a UE that wants to access the network initiates the random-access procedure by transmitting a preamble (Msg1) in the uplink on the PRACH. An eNB receiving the preamble and detecting the random-access attempt will respond in the downlink by transmitting a random-access response (Msg2) on the Physical Downlink Shared Channel (PDSCH). The random-access response carries an uplink scheduling grant for the UE to continue the procedure by transmitting a subsequent message in the uplink (Msg3) on the Physical Uplink Shared Channel (PUSCH) for terminal identification. See FIG. 4 for an illustration of the random-access procedure in LTE as specified in 3GPP TS 36.213 v.11.3.0.

When a UE uses the PRACH, it transmits a so-called random-access preamble in a known time/frequency resource in the OFDM grid. An illustration of PRACH resources, as specified for LTE Release 8 as defined in 3GPP TS 36.211 v.11.3.0, is given in FIG. 5. Here five different preamble formats are specified where a PRACH preamble consists of one or two sequences, each of length 24 576 time-domain samples. The preambles have a cyclic prefix, denoted CP in FIG. 5, of length between 3 168 and 21 024 samples for format 0 to 3.

In a more generalized setting, PRACH resources comprises of dedicated resources in the time-frequency grid where the UEs may be allowed to transmit a random-access preamble. A UE is typically configured with a PRACH configuration which specifies which PRACH resources that are available to the UE. This may also include which Random-Access (RA) preambles that are available to a given UE. In some situations, a given UE may have been assigned a unique preamble, in which case the random-access transmission will be contention-free. In other situations, several UEs may use the same preamble for transmission in the same RA-resource, in which case there is a contention-situation that must be resolved by the network.

In a network that uses Rx-beamforming, i.e. receiver beamforming, at the eNB there is an additional aspect to the PRACH resources, namely, the availability of Rx-beams pointing in a suitable direction. Inherent to the initial-access situation is the fact that the eNB will not know in advance from which direction the preamble transmitted from the UE will arrive. Hence, all possible Rx-beams must be utilized. However, the number of available Rx-beams in a given transmission-time interval (TTI), which typically is a subframe or a single OFDM-symbol, may be restricted. This is most commonly the case in a system that employs analog (time-domain) beamforming, but even in a system using digital beamforming a lack of processing chains may restrict the number of available Rx-beams.

To overcome the limitation in the number of available Rx-beams the eNB may scan in all directions over time. The drawback of this approach is that more PRACH resources have to be reserved compared to the case of omnidirectional PRACH reception. This also has a delay-aspect since a UE transmitting a PRACH-preamble must do this until the eNB employs an Rx-beam that points in a suitable direction, otherwise the random-access attempt may not be received at the eNB.

The reception of the PRACH signal may provide an initial estimate of the direction of, or suitable beam for, the UE from the network perspective. Such an estimate of the direction is necessary to obtain beamforming gains described above. The estimate may then be maintained and improved using beam tracking, as described below.

In existing cellular communication systems, e.g. LTE, the PRACH configurations are conveyed to a wireless communications device, such as a UE, using some broadcast mechanism. The amount of resources set aside for the PRACH is a trade-off between how much resources are removed from the other uplink channels, most notably the PUSCH, and the average latency of a random-access procedure. More PRACH resources mean that random-access opportunities occur more often at the cost of a lower maximum capacity of the PUSCH.

In a non-beam-based system, all available PRACH resources are expected to work in the sense that the eNB is not performing any Rx-beam sweeping. Hence, a transmission of a RA-preamble in a configured PRACH resource will result in the eNB detecting it assuming that the UE is within the coverage area. Herein, the possibility of an insufficient power setting in the UE and the fact that several UEs may have randomly chosen to transmit the same preamble leading to a contention situation is disregarded. This caveat will remain unchanged in a beam-based approach.

SUMMARY

It is an object of embodiments herein to solve at least some of the problems mentioned above, and to improve the performance of a wireless communications network.

Embodiments herein may for example improve the random-access procedure by reducing the delay associated with Tx/Rx beam tracking, e.g. in a network node such as an eNB, during the random-access procedure. In embodiments herein, both the UE and the eNB notice very quickly if a BTP loses a useful Tx/Rx-pair, or in other words, if the BTP is no longer working properly.

According to a first aspect of embodiments herein it is provided a method performed by a wireless communication device, for performing random access. The wireless communication device is configured with a first Random-Access (RA) configuration. The wireless communication device obtains an indication of a failure of a beam-tracking process. The wireless communication device adapts the RA configuration of the wireless communication device based on the obtained indication, wherein the adapting comprises switching from the first RA configuration to a second RA configuration having more frequently occurring RA-resources than the first RA configuration. The wireless communication device transmits a RA message with a RA resource to a network node. The RA resource is based on the adapted RA configuration.

According to a second aspect of embodiments herein it is provided a method performed by a serving network node for performing random access. The network node is configured with a first Random-Access (RA) configuration.

The network node obtains an indication of a failure of a beam-tracking process. The network node adapts the random-access configuration of the wireless communication device based on the obtained indication, wherein the adapting comprises switching from the first RA configuration to a second RA configuration having more frequently occurring RA resources than the first RA configuration. The network node receives a RA message with a RA resource from a wireless communication device. The RA resource is based on the adapted RA configuration.

According to a third aspect of embodiments herein it is provided a wireless communication device, for performing a method for random access. The wireless communication device is configured with a first Random-Access (RA) configuration. The wireless communication device is further configured to obtain an indication of a failure of a beam-tracking process. The wireless communication device is further configured to adapt the RA configuration of the wireless communication device based on the obtained indication, wherein the adapting comprises switching from the first RA configuration to a second RA configuration having more frequently occurring RA-resources than the first RA configuration. The wireless communication device is further configured to transmit a RA message with a RA resource to a network node. The RA resource is based on the adapted RA configuration.

According to a fourth aspect of embodiments herein it is provided a serving network node, for performing a method for random access. The network node is serving a wireless communication device and is configured with a first Random-Access (RA) configuration. The network node is configured to obtain an indication of a failure of a beam-tracking process. The network node is further configured to adapt the RA configuration of the wireless communication device based on the obtained indication, wherein the adapting comprises switching from the first RA configuration to a second RA configuration having more frequently occurring RA resources than the first RA configuration. The network node is further configured to receive a RA message from a wireless communication device. The RA message comprises a RA resource based on the adapted RA configuration.

According to a fifth aspect of embodiments herein it is provided a wireless communication device, for performing a method for random access. The wireless device comprises a processor and a memory. The memory contains instructions executable by said processor, whereby said wireless communication device is operative to obtain an indication of a failure of a beam-tracking process. The memory contains instructions executable by said processor, whereby said wireless communication device is operative to adapt a RA configuration of the wireless communication device based on the obtained indication, wherein the adapting comprises switching from a first RA configuration to a second RA configuration having more frequently occurring RA-resources than the first RA configuration. The memory further contains instructions executable by said processor, whereby said wireless communication device is operative to transmit a RA message with a RA resource to a network node. The RA resource is based on the adapted RA configuration.

According to a sixth aspect of embodiments herein it is provided a network node, for performing a method for random access. The network node comprises a processor and a memory. The memory contains instructions executable by the processor whereby said network node is operative to obtain an indication of a failure of a beam-tracking process. The memory contains instructions executable by the processor whereby said network node is operative to adapt the RA configuration of the wireless communication device based on the obtained indication, wherein the adapting comprises switching from the first RA configuration to a second RA configuration having more frequently occurring RA resources than the first RA configuration. The memory contains instructions executable by the processor whereby said network node is further operative to receive a RA message with a RA resource from a wireless communication device. The RA resource is based on the adapted RA configuration.

According to a seventh aspect of embodiments herein it is provided a wireless communication device for performing a method for random access. The wireless communication device comprises a detecting module configured to obtain an indication of a failure of a beam-tracking process. The wireless communication device comprises an adapting module configured to adapt the RA configuration of the wireless communication device based on the obtained indication, wherein the adapting comprises switching from the first RA configuration to a second RA configuration having more frequently occurring RA resources than the first RA configuration. The wireless communication device further comprises a transmitting module configured to transmit a RA message with a RA resource to a network node. The RA resource is based on the adapted RA configuration.

According to an eighth aspect of embodiments herein it is provided a network node, for performing a method for random access. The network node comprises a detecting module configured to obtain an indication of a failure of a beam-tracking process. The network node comprises an adapting module configured to adapt the RA configuration of the wireless communication device based on the obtained indication, wherein the adapting comprises switching from the first RA configuration to a second RA configuration having more frequently occurring RA-resources than the first RA configuration. The network node further comprises a receiving module configured to receive a RA message with a RA resource from a wireless communication device. The RA resource is based on the adapted RA configuration.

According to a further aspect of embodiments herein the wireless communication device detects the failure of the beam-tracking process by receiving a control message from the wireless communications network, e.g. from a serving network node, such as the first network node.

Based on the detected failure of the beam-tracking process the wireless communication device adapts a configuration of random-access resources for the wireless communication device. Since the wireless communication device transmits the random-access message to the network node with the random-access resource based on the adapted configuration of random-access resources the time for the random-access procedure will be reduced since the average time before a random-access resource is available is shortened, and the time before a receive-beam scanning in the network node has cycled through all available beams is decreased.

DETAILED DESCRIPTION

In a 5G-system, the use of beam-based transmission and reception may be a cornerstone. Some mechanisms may be utilized that may track Tx/Rx beam-pairs that are suitable for data transfer. What kind of reference symbols that are utilized for this, or how the mechanisms operate, is outside the scope of embodiments herein.

However, such a beam-tracking procedure presents a new failure mode of the UE/eNB connection that is not present in a non-beam forming system. That is, the UE is still within a geographical area covered by the eNB and the UE has sufficient transmit power to reach the eNB, but the necessary information about suitable beams is not present, and hence, the connection fails.

In a system where the eNB employs Rx-beam sweeping over time, the Rx-beam direction must coincide with the direction towards the UE transmitting the preamble in order for the RA-transmission to have a reasonable chance of being received. Depending on the time it takes the eNB to scan all Rx-beams, the delay before the RA-transmission is received may be substantial. The sweeping period depends on the number of Rx-beams that may be used for RA-reception in each TTI as well as how frequently RA-resources occur over time.

Figure 1:
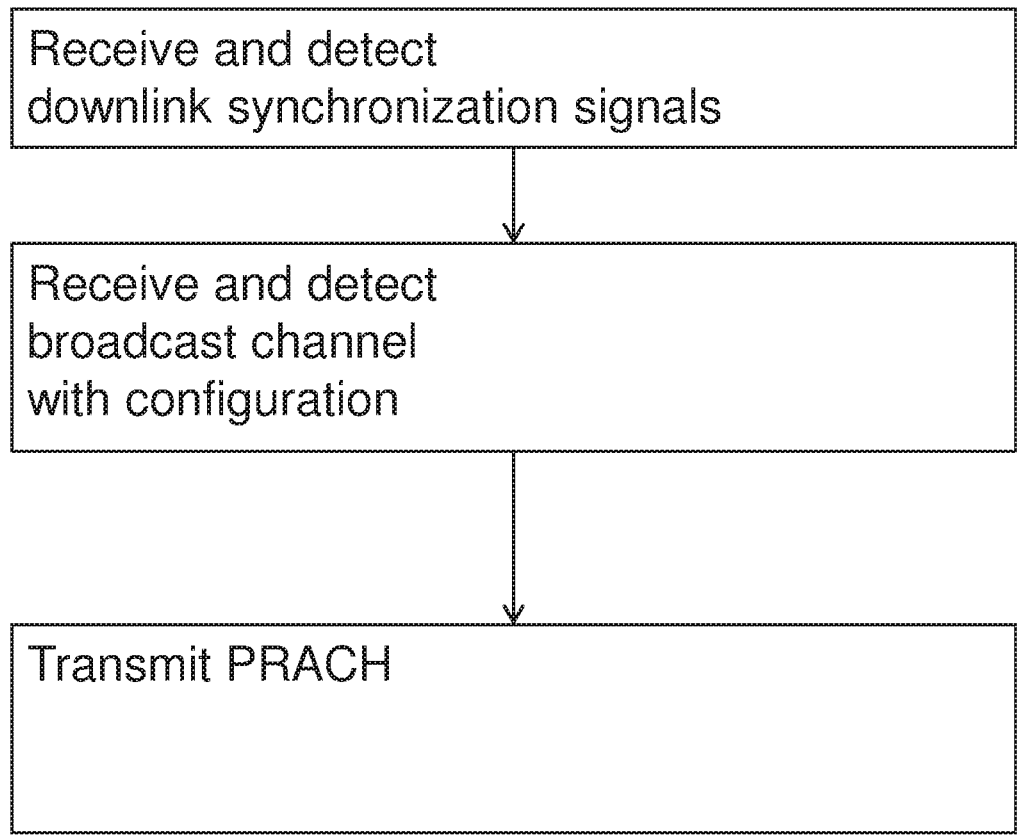
FIG. 1 illustrates a simplified method performed by a UE for random access.
Figure 2:
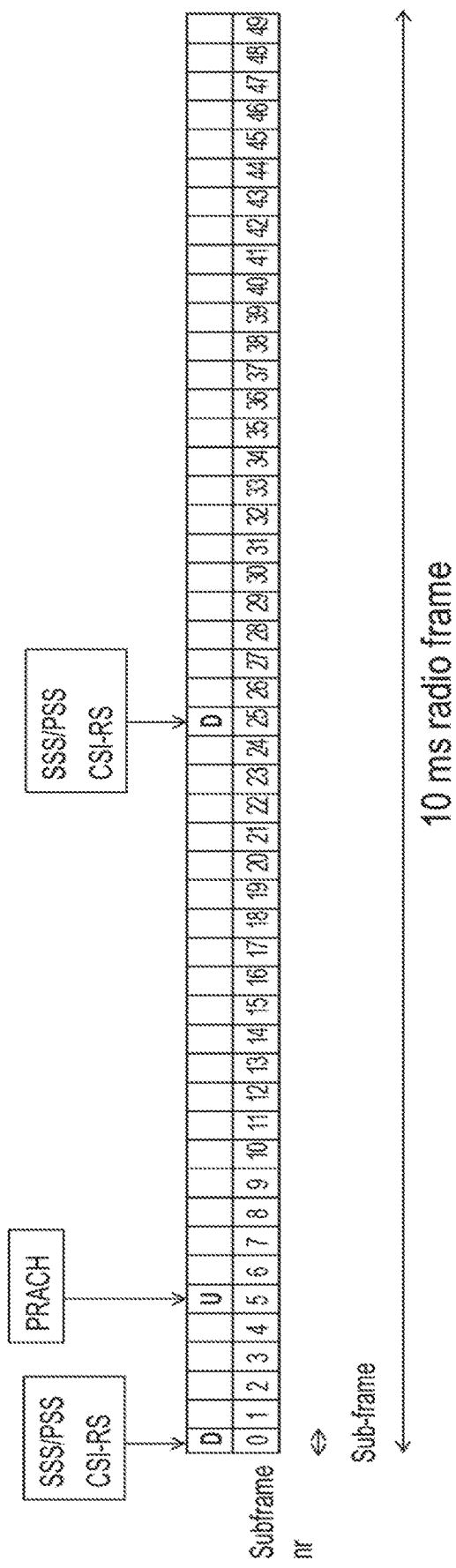
FIG. 2 illustrates a Time-Division Duplexing (TDD) system.
Figure 3:
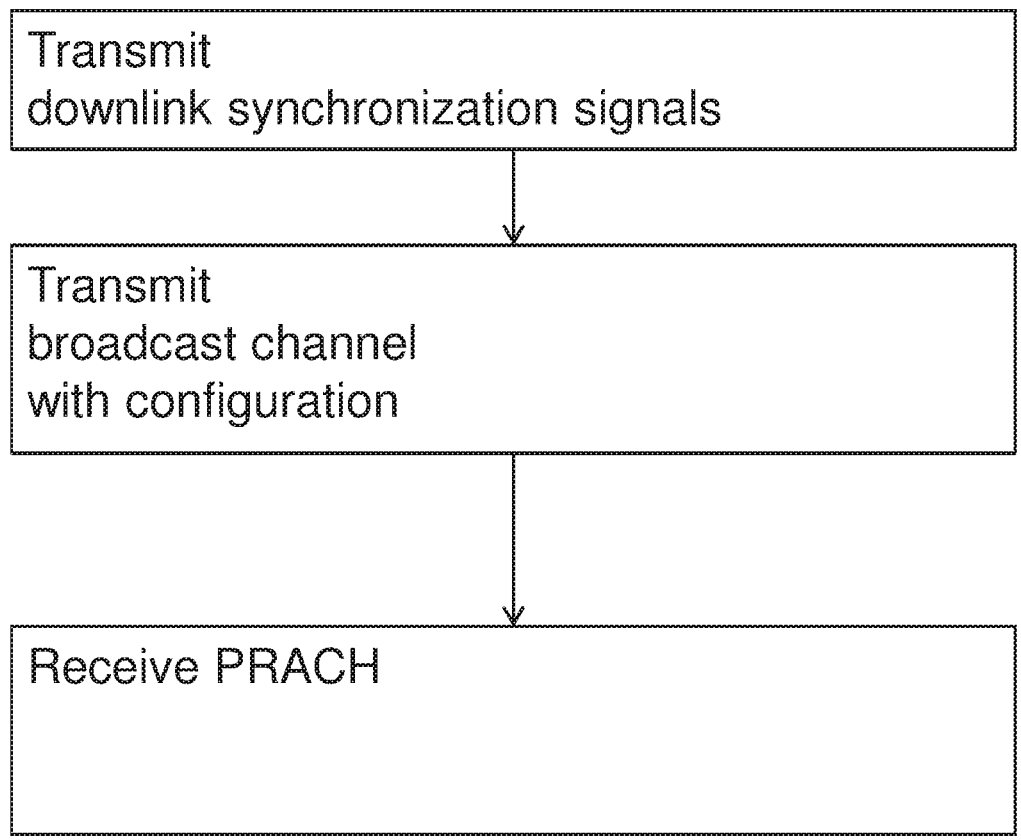
FIG. 3 illustrates a procedure performed by an eNB.
Figure 4:
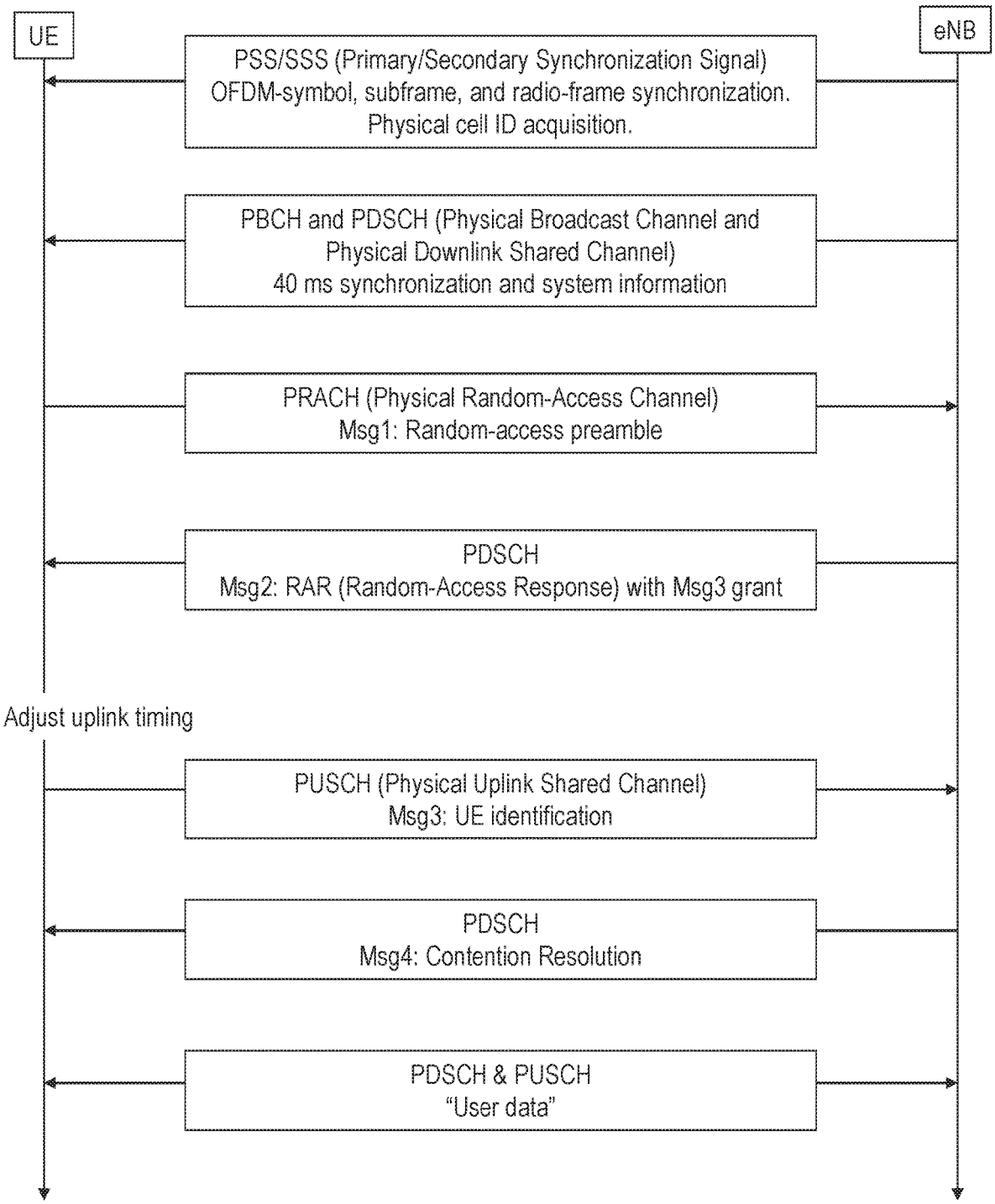
FIG. 4 illustrates a random access procedure in LTE.
Figure 5:
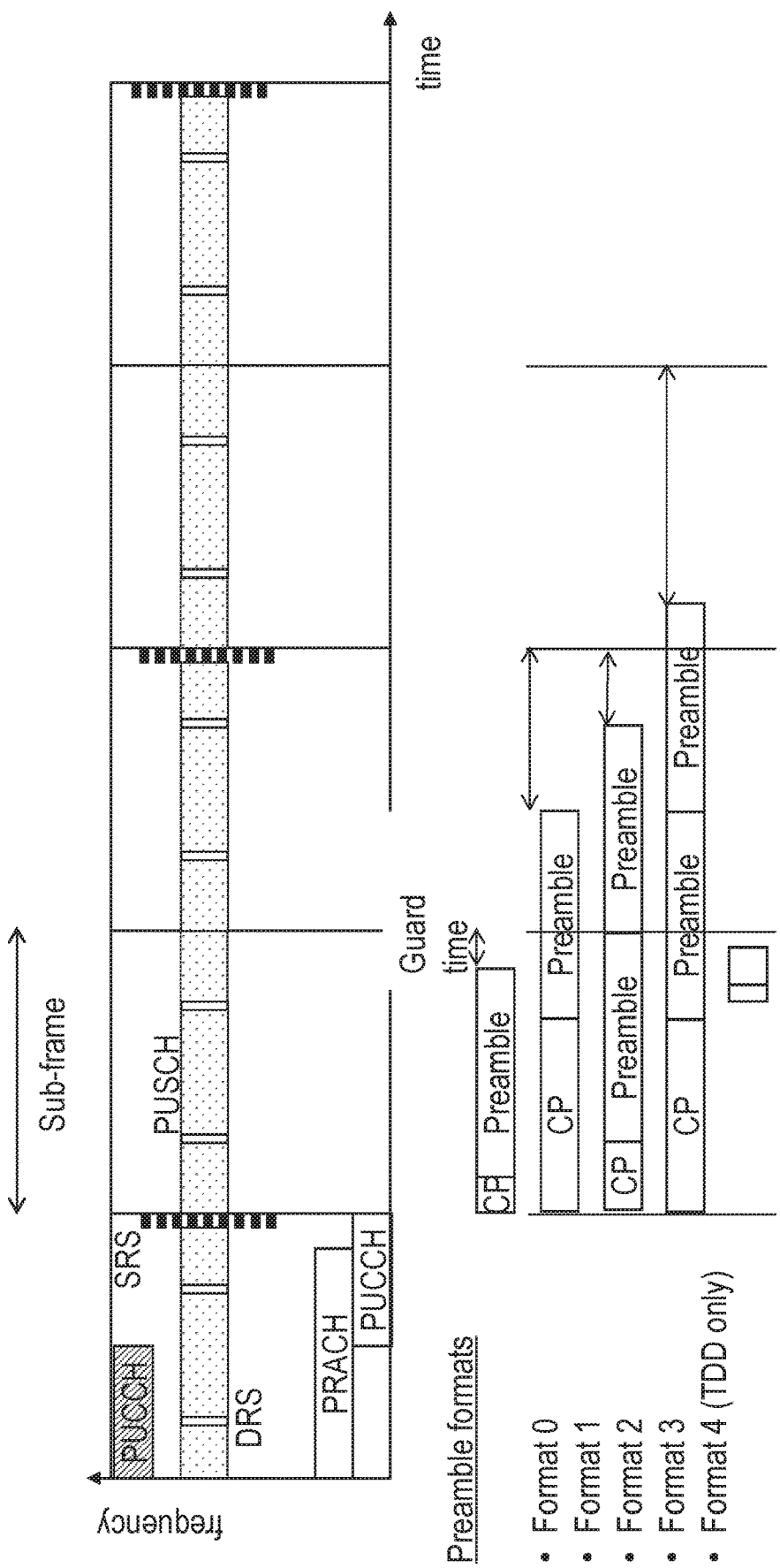
FIG. 5 illustrates Physical Random Access Channel (PRACH) resources.
Figure 6:
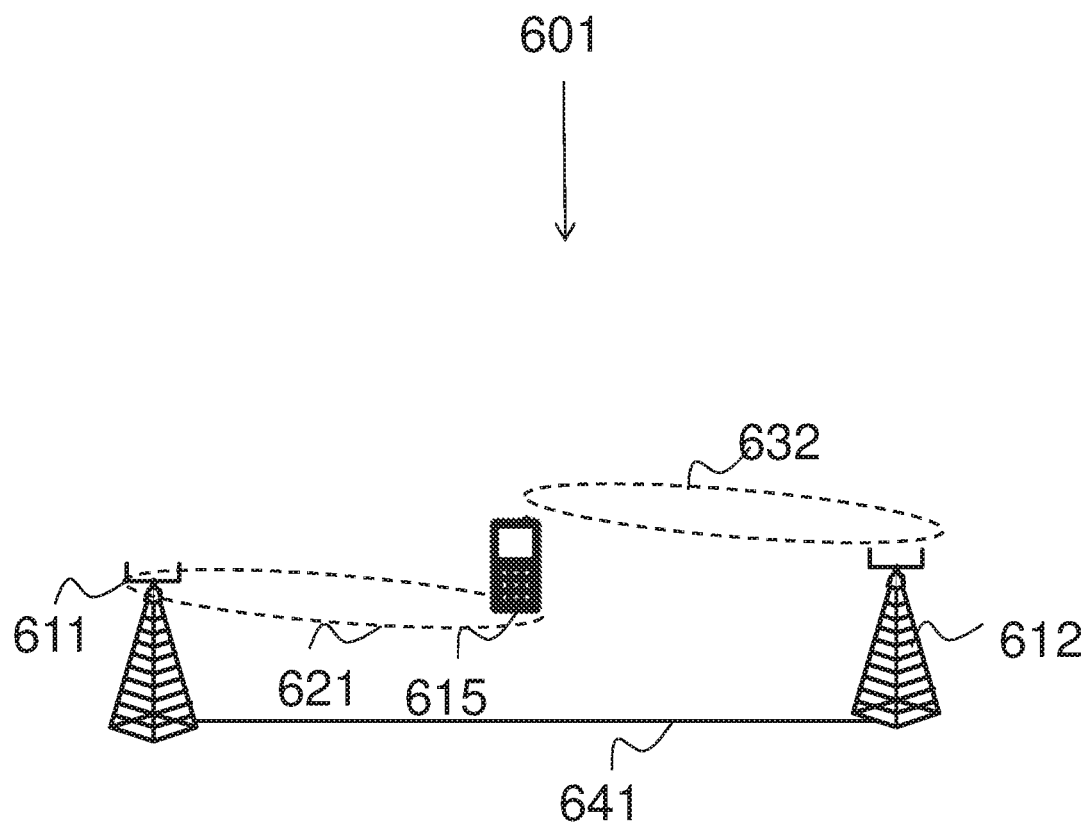
FIG. 6 depicts parts of a wireless communications network.

Embodiments herein may be implemented in one or more wireless communications networks. FIG. 6 depicts parts of such a wireless communications network 601. The wireless communications network 601 may for example be a 5G/New Radio (NR), any 3GPP or any cellular wireless communications network or system that makes use of beams. 5G/NR will hereafter be used to exemplify the embodiments although the embodiments are thus not limited thereto.

The wireless communications network 601 comprises a plurality of base stations and/or other network nodes. More specifically, the wireless communications network 601 comprises a first network node 611, such as an access network node.

The wireless communications network 601 may further comprise a second network node 612. The second network node 612 may for example be a neighbour network node, such as a neighbour access network node, to the first network node 611.

The term "network node" may correspond to any type of radio network node or any network node, which communicates with at least a radio network node. For example, the first network node 611 may be a base station, such as an eNB. The base station may also be referred to as a NodeB, an evolved Node B (eNB, eNode B), a base transceiver station (BTS), Access Point (AP) Base Station, Wi-Fi AP, base station router, or any other network unit capable of communicating with a wireless communication device within a cell served by the base station depending e.g. on the radio-access technology and terminology used.

The first network node 611 and/or the second network node 612 may also each be an RNC in an UMTS system.

In embodiments herein the first network node 611 serves wireless communications devices, such as a wireless communications device 615.

The wireless communications device 615 may further be e.g. a mobile terminal or a wireless terminal, a mobile phone, a computer such as e.g. a laptop, a Personal Digital Assistants (PDAs) or a tablet computer, sometimes referred to as a surf plate, with wireless capability, target device, device-to-device UE, Machine-Type Communication UE or UE capable of machine-to-machine communication, iPad, mobile terminals, smart phone, Laptop-Embedded Equipment (LEE), Laptop-Mounted Equipment (LME), USB dangles, etc. or any other radio network units capable to communicate over a radio link in a wireless communications network.

Please note the term User Equipment used in this disclosure also covers other wireless devices such as Machine-to-machine (M2M) devices, even though they are not operated by any user.

Network nodes, such as base stations and Wi-Fi AP, communicate over the air or radio interface operating on radio frequencies with wireless communication devices within range of the network nodes. The wireless communication devices transmit data over the radio interface to network nodes, such base stations and Wi-Fi AP, in UL transmissions, and network nodes, such as Wi-Fi AP and base stations, transmit data over an air or radio interface to the wireless communication devices in DL transmissions.

The first network node 611 may communicate with the wireless communications device 615 over a radio link, such as a first radio link, associated with the first network node 611. The first radio link may be associated with the first network node 611 since it is a radio link between the first network node 611 and the wireless communications device 615. This may also be referred to as the first network node 611 being a serving network node. The first radio link may be provided by a first beam 621. In embodiments herein the first beam 621 may comprise a first Tx/Rx beam-pair. The first network node 611 may communicate with the wireless communications device 615 over further radio links.

The second network node 612 may communicate with the wireless communications device 615 over a second radio link, associated with the second network node 612. The second radio link may be provided by a second beam 632. The second network node 612 may communicate with the wireless communications device 615 over further radio links.

The wireless communications network 601 may further comprise cells serving wireless communication devices. A cell is a geographical area where radio coverage is provided by network node equipment such as Wi-Fi AP equipment, base station equipment at a base station site or at remote locations in Remote-Radio Units (RRU). The first network node 611 may be an example of such network node equipment.

Radio beams may have a similar function as the cells described above.

The first network node 611 may communicate with the second network node 612, e.g. over a first interface 641, such as an X2-interface.

In this section, embodiments, such as methods for a random-access procedure, will be illustrated in more detail by a number of exemplary embodiments. The following embodiments will be described using NR as an example and the first network node 611 will be an NR base station, i.e. an eNB.

It should be noted that these embodiments are not mutually exclusive. Components from one embodiment may be tacitly assumed to be present in another embodiment and it will be obvious to a person skilled in the art how those components may be used in the other exemplary embodiments.

Consider a system of an eNB and a UE that has a default PRACH configuration that strikes an acceptable balance between RA-delay during initial access and maximum UL throughput. Further assume that the system (eNB and UE) has mechanisms to track Tx/Rx beam-pairs. A UE and/or an eNB may have one or several such pairs. In the case of UL/DL reciprocity, it may be the same pair that is used bi-directionally for both UL and DL. In the case where there is no reciprocity, the system must track separate Tx/Rx-pairs for UL and DL. There may also be Tx/Rx-pairs that are not actively used for data transmission or signaling, but simply monitored and tracked for future use in a hand-over situation.

Each Tx/Rx-pair is maintained using a so-called beam-tracking process (BTP). The beam-tracking process may also be referred to as a Beam-pair link (BPL). As was already mentioned above, the details of how such a BTP works is outside the scope of this document. However, it is reasonable to assume that a BTP has some mechanism that monitors the quality of the Tx/Rx-pair. This may be based on on-going data transmissions or dedicated reference symbols.

Figure 7:
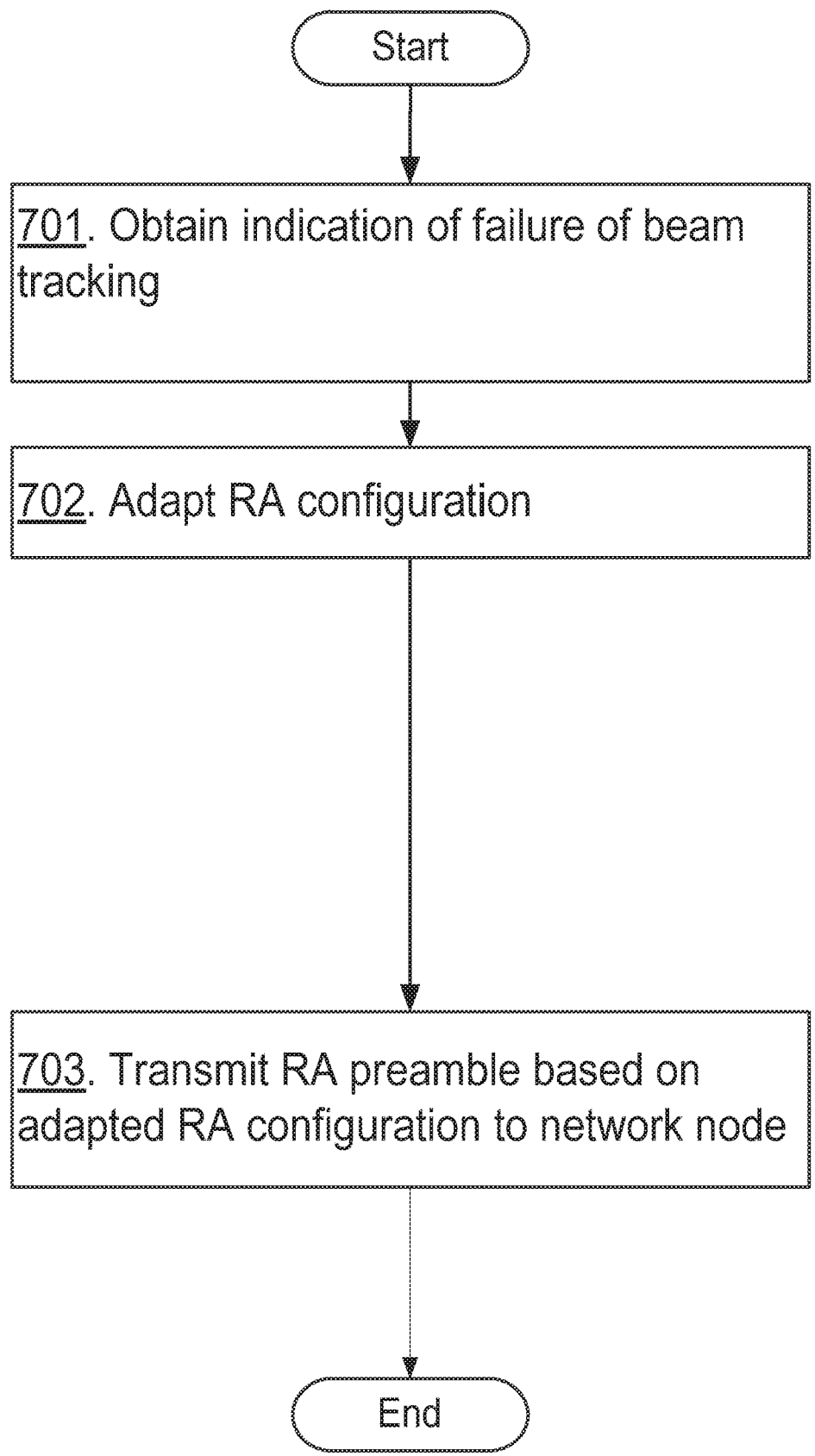
FIG. 7 illustrates a method for operating a wireless communication deVice.

The following embodiments are related to the wireless communication device 615. The wireless communication device 615 embodiments relate to FIGS. 7 and 11.

According to an aspect of embodiments herein it is provided a method for operating the wireless communication device 615, e.g. for random access, in the wireless communications network 601. The wireless communication device 615 may:

- detect 701 a failure of a beam-tracking process or procedure, such as e.g. BPL. The failure may involve losing a connection, such as the first radio link, towards the first network node 611. For example, due to that the first network node 611 and the communication device 615 may not be able to track a first Tx/Rx beam-pair the connection towards the wireless communication device 615 over the first radio link may be lost. For example, it may be the Rx-beam of the UE and/or the Tx-beam of the eNB that fails. The eNB may track the link consisting of the Tx/Rx-pair by adjusting both the Tx-beam and/or the Rx-beam.

In some embodiments herein the wireless communication device 615 detects the failure of the beam-tracking process by receiving a control message from the wireless communications network, e.g. from a serving network node, such as a first network node. The control message may serve as an indication of the failure of the UL beam-tracking process. For example, this may happen when the BTPs for UL and DL are separate and the BTP for UL has failed but the BTP associated with the DL is still operational.

In other words, both when the wireless communication device 615 detects the failure itself and when the wireless communication device 615 receives the indication the wireless communication device 615 may obtain 701 the indication of the failure of the beam-tracking process.

In the case of an active BTP, i.e. one that is currently used for transmission and reception, the re-establishment of the connection may be of highest priority. This may lead to either continuing to use another already active BTP or switching to one or more passive BTPs. However, in the case of no viable BTPs available, e.g. if there are no BTPs that provide an acceptable performance for the transmission, or no BTP that will work at all, the wireless communication device 615 may perform a random-access (RA) procedure. Since both the wireless communication device 615 and the first network node 611 know that the BTP(s) failed, both sides also know that an RA-procedure may be imminent.

This action may be performed by means such as a detecting module 1110 in the wireless communication device 615. The detecting module 1110 may be implemented by a processor 1180 in the wireless communication device 615.

- adapt 702 its random-access configuration, e.g. a configuration of random-access resources for the wireless communication device 615. The wireless communication device 615 adapts the random-access configuration based on the detected failure of the beam-tracking process.

In one embodiment, both the wireless communication device 615 and the first network node 611, such as the eNB, automatically switch to, or replace, a pre-configured PRACH-configuration with a larger and/or denser PRACH-configuration, e.g. a PRACH-configuration with more frequently occurring RA-resources than the pre-configured PRACH-configuration or default PRACH-configuration, upon detection of BTP-failure (s). As mentioned above, the default PRACH configuration is a PRACH-configuration that is normally utilized in the wireless communications network 601. It is typically broadcast in some kind of broadcast message that reaches all wireless devices as soon as they have acquired synchronization with a base station in the wireless communications network 601. This enables the wireless communication device 615 to quicker initiate a RA-procedure and re-establish a connection, such as the first radio link. In some embodiments, the larger and/or denser PRACH-configuration may have the default PRACH-configuration as a proper subset. In this way any other wireless communication devices not involved in the BTP-failure triggering the larger PRACH-configuration will still be able to perform RA without being affected by the enlarged set.

This action may be performed by means such as an adapting module 1120 in the wireless communication device 615. The adapting module 1120 may be implemented by the processor 1180 in the wireless communication device 615.

- transmit 703 a random-access message to a network node, such as the first network node 611, or the second network node 612, with a random-access resource based on the adapted configuration of random-access resources. This action may be performed by means such as a transmitting module 1130 in the wireless communication device 615. The transmitting module 1130 may be implemented by the processor 1180 in the wireless communication device 615.

Embodiments herein may be performed in the wireless communication device 615. The wireless communication device 615 may comprise the modules mentioned above and depicted in FIG. 10.

In the following embodiments related to the first network node 611 will be described.

Figure 8:
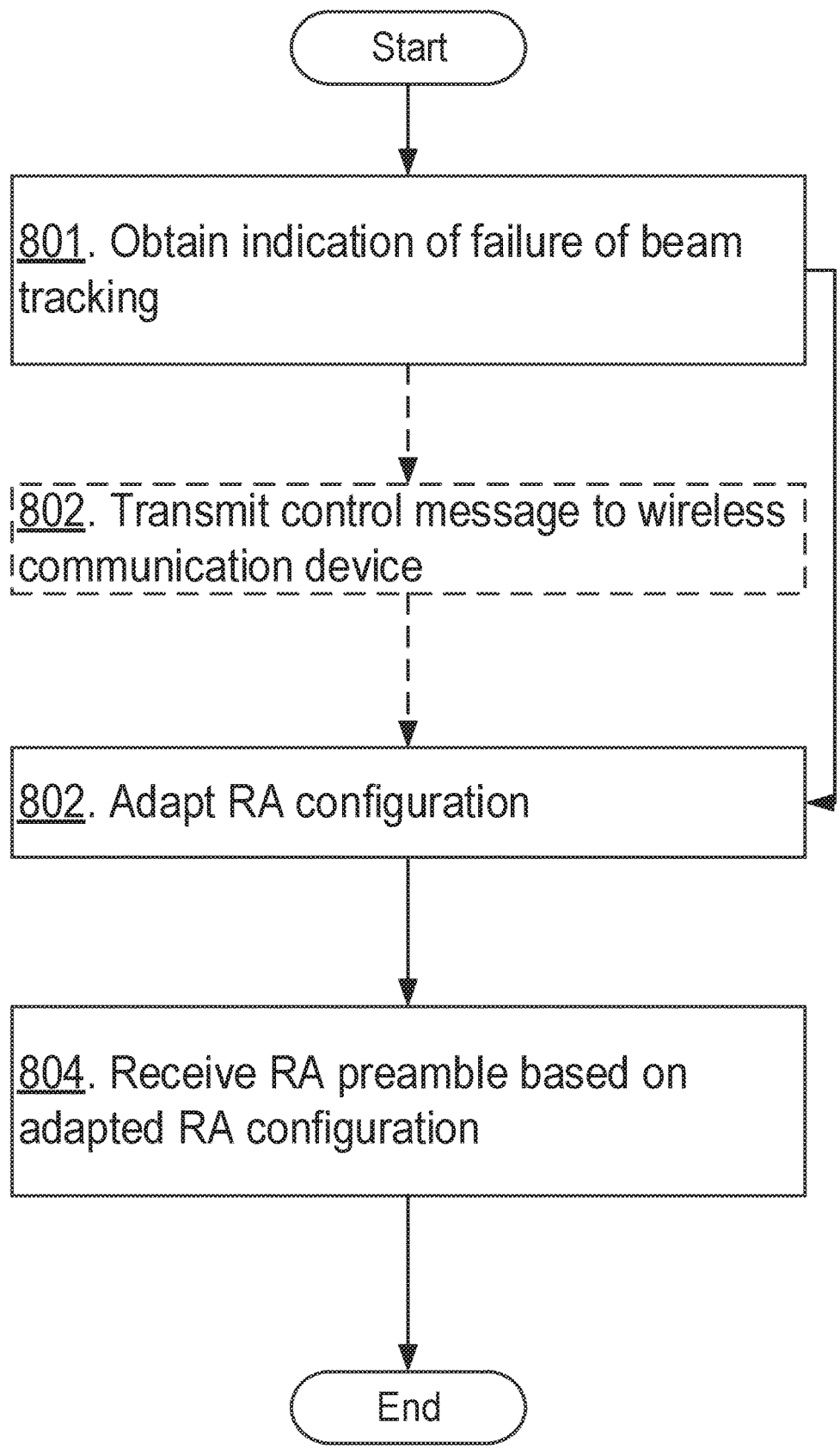
FIG. 8 shows a method for operating a network node.
Figure 12:
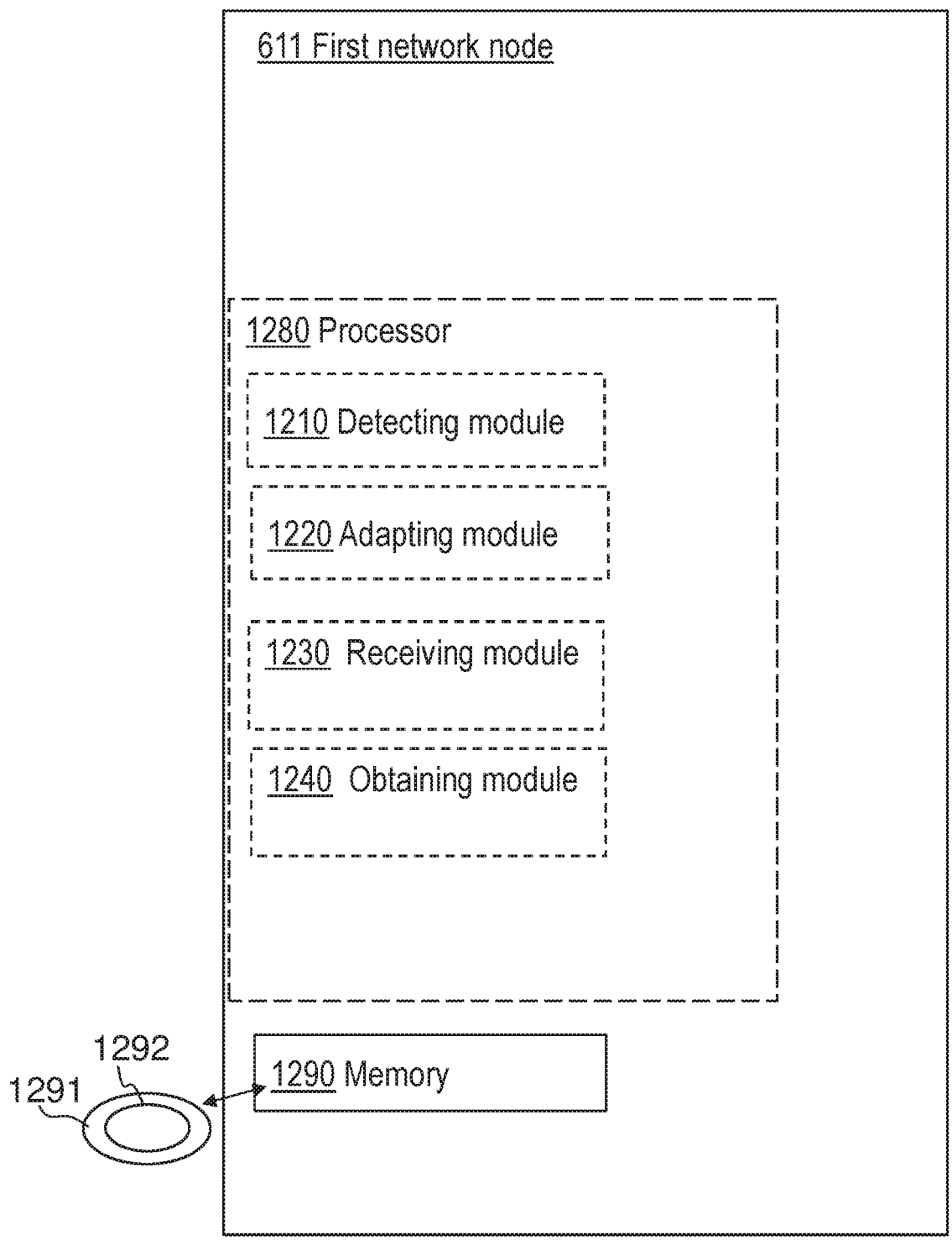
FIG. 12 is a block diagram illustrating an example network node.

The first network node 611 embodiments relate to FIGS. 8 and 12.

According to an aspect of embodiments herein it is provided a method for operating the first network node 611, e.g. for random access, in the wireless communications network 601. The first network node 611 may:

- detect 801 a failure of a beam-tracking process or procedure. In other words, the first network node 611 may obtain 801 an indication of the failure of the beam-tracking process. The failure may involve losing a connection, such as the first radio link, towards the wireless communication device 615. For example, due to that the first network node 611 may not be able to track the first Tx/Rx beam-pair the connection towards the wireless communication device 615 over the first radio link may be lost.

This action may be performed by means such as a detecting module 1210 in the first network node 611. The detecting module 1210 may be implemented by a processor 1280 in the first network node 611.

adapt 802 the random-access configuration of the wireless communication device 615, e.g. the configuration of random-access resources for the wireless communication device 615. The first network node 611 adapts the random-access configuration based on the detected failure of the beam-tracking process. In one embodiment, the first network node 611 automatically switches to, or replaces, a pre-configured PRACH-configuration with a larger and/or denser PRACH-configuration, e.g. a PRACH-configuration with more frequently occurring RA-resources than the pre-configured PRACH-configuration or default PRACH-configuration, upon detection of BTP-failure(s). This enables the wireless communication device 615 to quicker initiate a RA-procedure and re-establish a connection, such as the first radio link.

In some embodiments, the larger and/or denser PRACH-configuration may have the default PRACH-configuration as a proper subset. In this way any other wireless communication devices not involved in the BTP-failure triggering the larger PRACH-configuration will still be able to perform RA without being affected by the enlarged set.

This action may be performed by means such as an adapting module 1220 in the first network node 611. The adapting module 1220 may be implemented by the AO processor 1280 in the first network node 611.

receive 803 a random-access message from the wireless communication device 615, with a random-access resource based on the adapted configuration of random-access resources.

This action may be performed by means such as a receiving module 1230 in the first network node 611. The receiving module 1230 may be implemented by the processor 1280 in the first network node 611.

Embodiments herein may be performed in the first network node 611. The first network node 611 may comprise the modules mentioned above and depicted in FIG. 11.

Some further embodiments will now be described. In these embodiments, the wireless communication device 615 will be exemplified with a UE and the first network node will be exemplified with an eNB.

In some embodiments, the PRACH-configuration of the first embodiment is available for a, e.g. preset, duration in time and then expires with automatic restoration of the default configuration. This means that the enlarged PRACH-set is available for a limited time during which the re-establishment of the BTP is initiated and then the system, i.e. the wireless communication device 615 and the first network node 611, is back using the default set. A technical advantage is that for the limited time the enlarged PRACH-set is available without any signaling necessary between the UE and the eNB.

In some further embodiments, the PRACH-configuration of the first embodiment is used only until the UE has re-establish a BTP or until a timer has expired, whichever comes first. The default configuration is then used thereafter. These embodiments may have the same advantages as the previous embodiments with the additional advantage that the UE and the eNB know when the BTP has been re-established, and hence, may revert to the default PRACH-set sooner, thus not wasting unnecessary UL resources on extra PRACH-resources that will not be needed.

In yet some further embodiments, a UE using a latency or delay-critical connection is configured with a PRACH-configuration with more frequently occurring RA-resources. That is, in these embodiments the method is not applied for all UEs but for certain UEs that fulfill this criterion. A latency or delay-critical connection may be a connection used by a UE belonging to a specific service class with stricter requirements for transmission latency than typically used and applicable to other service classes.

In some embodiments, the UE of the fifth embodiment is a high-speed mobility UE.

In some embodiments, the UE of the fifth embodiment is a so-called "ultra-reliable low-latency" UE, which means that it belongs to a specific service class with stricter requirements for transmission latency and/or transmission reliability than typically used and applicable to other service classes.

In some embodiments, the RA procedure is triggered by the network, such as the first network node 611, using downlink control signaling, e.g., when UL synchronization is lost in the wireless communication device 615.

As mentioned above, the BTPs for UL and DL may be separate. Then the UE may detect that the BTP has failed by receiving an indication of the failure, e.g. in a control message, from the network, e.g. from the serving eNB, such as the first network node 611.

For example, in some embodiments the eNB schedules the UE in UL and the UE transmits. However, the UL is no longer working due to that the BTP for the UL has failed. The eNB understands and/or detects this and sends the control message to the UE using the still functional DL BTP, which is the way the UE understands and/or detects that the UL BTP has failed. Then the UE may enlarge the PRACH-configuration and start the RA-procedure.

Examples of DL control signaling may comprise scheduling of the RA-procedure using the (e) PDCCH or any kind of trigger in a DCI-message (grant). The RA-procedure may also be triggered at the MAC-level using a MAC Control Element.

In some embodiments, the serving node, such as the first network node 611, informs the neighbor nodes, such as the second network node 612, to increase the PRACH-resource density when BTP-failure is detected. The UE may lose connection to the serving node and detect the neighbor node as the strongest node during the re-establishment. The first network node 611 may also adapt its own PRACH-resource density. For example, the BTP-failure may be due to a temporary loss of connection towards the serving eNB, and the re-establishment of the BTP may very well be towards the serving eNB again. However, in some scenario, e.g. if the UE is traveling on a high-speed train, the eNB may have velocity-information about the UE that makes it unnecessary to enlarge the PRACH-set of the eNB, which the UE is known to be leaving.

In some embodiments, the adapted PRACH configuration depends on the load of the wireless communications network 601, e.g. a system load. For example, the UE may read a system load indication from a system information. In a system with zero load, all subframes except fixed downlink subframes may be configured as PRACH resources. In a system with high load, only part of the subframes may be configured as the PRACH resources.

In some embodiments, the details of the denser PRACH configuration is broadcasted in the system information. The configuration may depend on the current system load or other input conditions.

Figure 9:
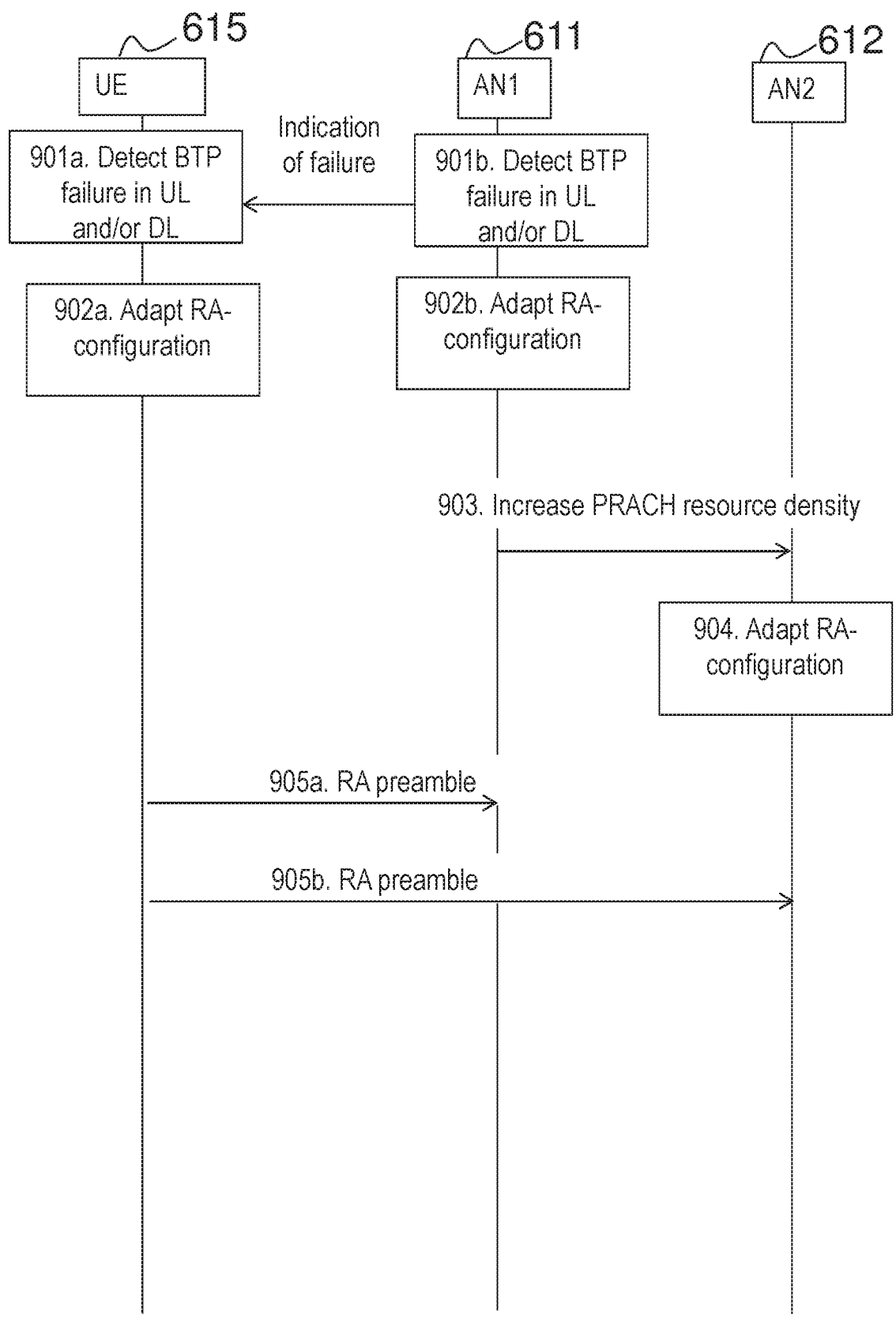
FIG. 9 is a diagram illustrating some example embodiments.

FIG. 9 is a diagram that illustrates some exemplary embodiments herein. The wireless communication device 615 detects 901a BTP failure, which may also be referred to as a BPL failure. The first network node 611 also detects 901b the same BTP failure. The wireless communication device 615 adapts 902a its PRACH-configuration, or in other words its RA-configuration. The first network node 611 may also adapt 902b the PRACH-configuration of the wireless communication device 615. In some embodiments, the first network node 611 may provide, e.g. by transmitting, 903 an indication to increase the PRACH configuration or PRACH resources for the wireless communication device 615 to a neighbour network node, such as the second network node 612. The second network node 612 may then adapt 904 the PRACH-configuration of the wireless communication device 615.

The wireless communication device 615 then transmits 905a, 905b a RA preamble which may be received by network node. For example, the wireless communication device 615 may transmit 905a the RA preamble which is received by the first network node 611. The wireless communication device 615 may also transmit 905b the RA preamble which is received by the second network node 612. Which network node that receives the RA preamble may depend on e.g. the mobility of the wireless communication device 615, e.g. depending on the velocity of the wireless communication device 615. Generally, the UE may transmit the RA preamble "in the blind" and hoping that at least one network node will hear the transmission. It's up to the network nodes to sweep the Rx-beams in a manner so that all directions are (eventually) covered. It is also up to the network nodes, such as the first network node 611, to decide which neighbor nodes, such as the second network node 612, should adapt, which may also be referred to as listen to the enlarged PRACH set. This is only meaningful to do in network nodes, such as eNBs that have a reasonable probability of hearing the transmission.

Figure 10:
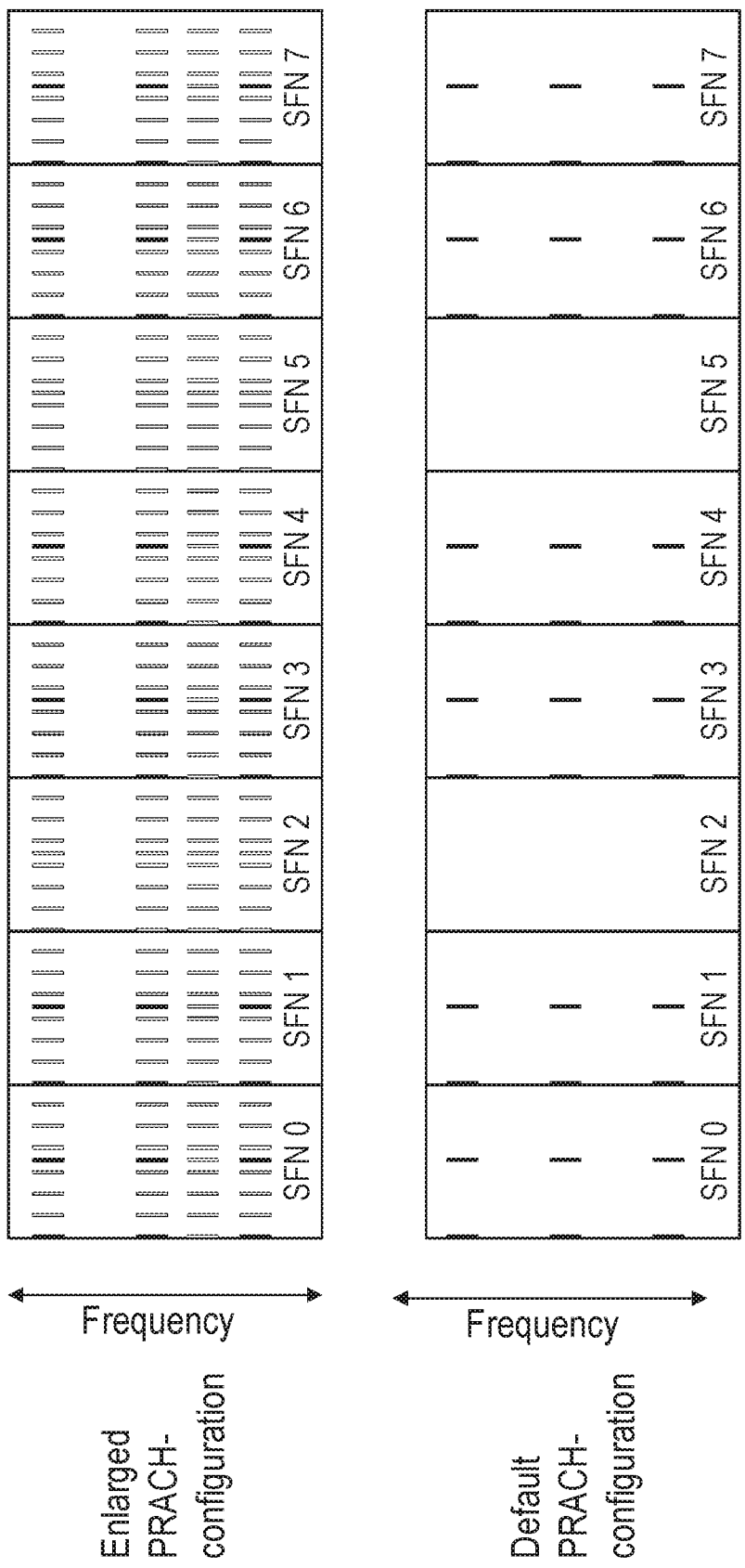
FIG. 10 shows example PRACH configurations, including a larger PRACH-configuration.

The wordings "larger PRACH-configuration" and "denser PRACH-configuration" and "more frequently occurring RA-resources" may all mean exactly the same thing as may be illustrated with FIG. 10. At the bottom of FIG. 10 is an exemplary default PRACH-configuration consisting of reserved resources (indicated as black rectangles) in both time and frequency, in some of the subframes. The upper part of the figure shows an exemplary enlarged PRACH-configuration with additional resources in both time and frequency added. The additional resources are marked as white rectangles. Note that the enlarged set comprises the combination of the default set and the additional resources.

"Larger" may mean that there are more PRACH opportunities in the set. "Denser" may mean that the PRACH opportunities occur more densely in a time and/or a frequency domain. "Frequently" as in "more often" in any available dimension.

Note in the figure that the enlargement in the time domain may be both in more PRACH-resources within a given subframe (SF) as well as adding resources in SFs that are not utilized at all in the default configuration. Also note that the extended set contains the default configuration as a proper subset.

The following advantages of embodiments herein have been identified:

The number of PRACH resources may be adapted to fit the current traffic situation in the network. For example:

In a steady-state situation where all (or most) UEs present in the coverage area of an eNB have established Tx/Rx beam-pairs, the number of PRACH resources may be made small to maximize the number of time/frequency resources available for data transmission.

In a situation where some UEs have intermittent traffic, and may thus be expected to issue a random-access procedure "soon", the number of PRACH resources available to those UEs may be increased in order to decrease the average latency caused by the RA-procedure. Intermittent traffic may mean that the traffic is "on" and "off" on such a time-scale that the beam tracking is not maintained continuously, but still likely to transmit more frequently than other UEs that are idle in the service area. Thus, these UEs are not transmitting "all the time" and thus maintaining Tx/Rx beam-pair(s) or are transmitting quite seldom but still present.

In a situation where a UE has just lost a working Tx/Rx beam-pair, the number of PRACH resources may temporarily be increased significantly assuming that the UE will try to re-establish the connection using a RA-procedure. Thus, an advantage may be improved re-establishment in the sense of latency, since available PRACH-resources will (on average) be present quicker.

Embodiments herein introduce adaptive PRACH configurations. This may be utilized in a variety of situations. However, it is of particular interest in a beam-based system where the failure of tracking Tx/Rx beam-pairs may be readily detected thus indicating that a random-access procedure is imminent leading to an automatic increase in PRACH-resources.

Figure 11:
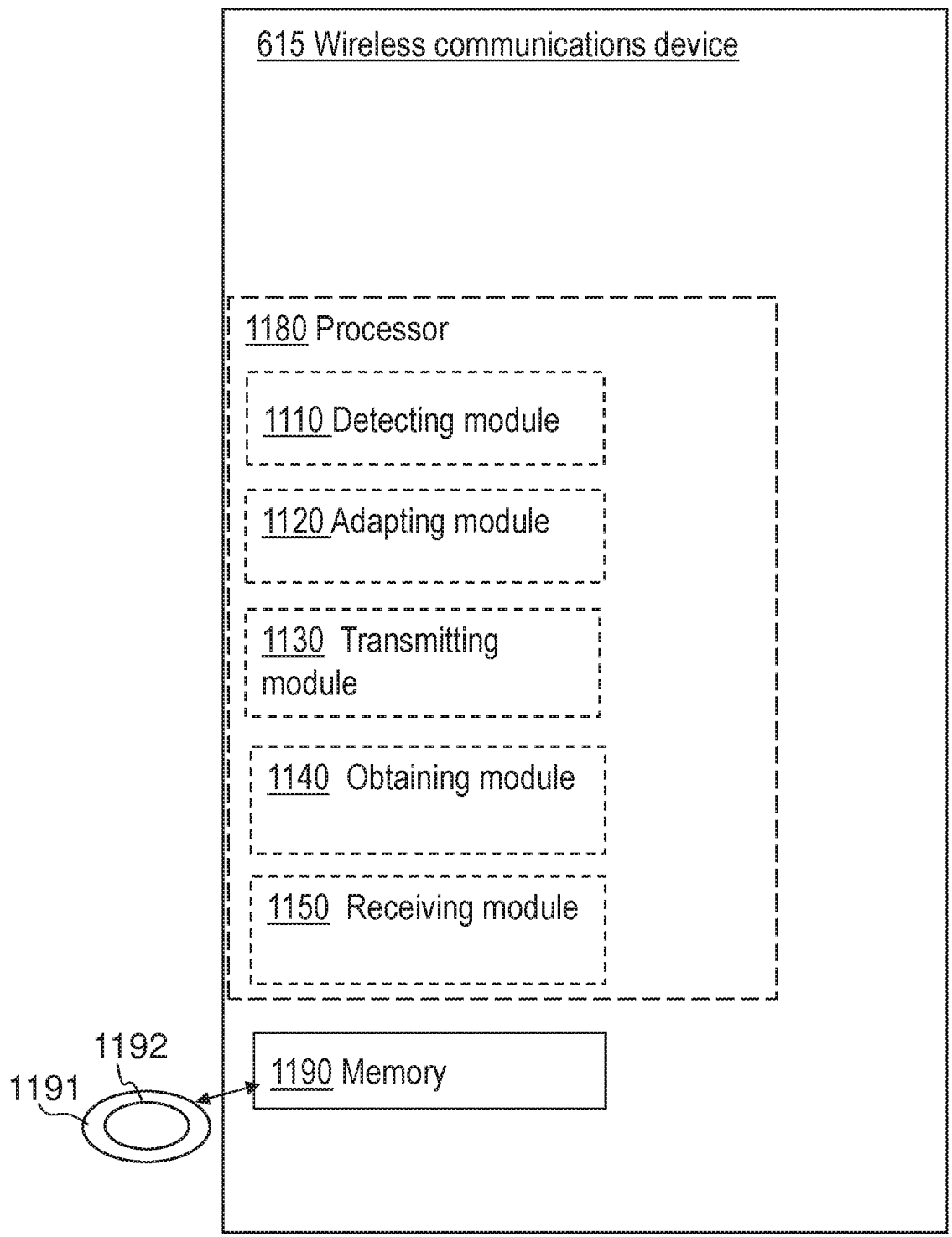
FIG. 11 is a block diagram illustrating an example wireless communication deVice.

FIG. 11 is a block diagram depicting the wireless communication device 615 for performing a method for random access. The wireless communication device 615 may comprise a processor 1180 configured to perform the method as described herein, as performed by the wireless communication device 615. Dashed lines of a box in FIG. 11 indicate that this box is not mandatory and relates to some embodiments only.

The wireless communication device 615 is configured to obtain an indication of a failure of a beam-tracking process.

In some embodiments, the wireless communication device 615 may comprise an obtaining module 1140, a detecting module 1110 and/or the processor 1180 being configured to obtain an indication of a failure of a beam-tracking process.

The wireless communication device 615 is further configured to adapt the RA configuration of the wireless communication device 615, based on the obtained indication. The adapting may comprise switching from the first RA configuration to a second RA configuration having more frequently occurring RA resources than the first RA configuration. This may also be referred to as the second RA configuration having denser RA resources than the first RA configuration.

In some embodiments, the wireless communication device 615 may comprise an adapting module 1120 and/or the processor 1180 being configured to adapt the RA configuration of the wireless communication device 615 based on the obtained indication, wherein the adapting comprises switching from the first RA configuration to a second RA configuration having more frequently occurring RA resources than the first RA configuration.

The wireless communication device 615 is further configured to transmit, to a network node (611, 612), a RA message using a RA resource, which RA resource is based on the adapted RA configuration.

In some embodiments, the wireless communication device 615 may comprise a transmitting module 1130 and/or the processor 1180 being configured to transmit, to a network node 611, 612, a RA message using a RA resource, which RA resource is based on the adapted RA configuration.

The wireless communication device 615 may further be configured to obtain the indication by detecting a loss of a connection towards the network node 611.

In some embodiments, the wireless communication device 615 may comprise the processor 1180, the obtaining module 1140 or the detecting module 1110 further being configured to obtain the indication by detecting a loss of a connection towards the network node 611.

The wireless communication device 615 may further be configured to obtain the indication by receiving a control message from the network node 611, which control message indicates a failure of an Uplink, UL, beam-tracking process.

In some embodiments, the wireless communication device 615 may comprise a receiving module 1150 or the processor 1180 or the obtaining module 1140 or the detecting module 1110 further being configured to obtain the indication by receiving a control message from the network node 611, which control message indicates a failure of an Uplink (UL) beam-tracking process.

The wireless communication device 615 may further be configured to restore the first RA configuration when a limited time has expired.

In some embodiments, the wireless communication device 615 may comprise the processor 1180 or the adapting module 1120 further being configured to restore the first RA configuration when a limited time has expired.

The wireless communication device 615 may further be configured to restore the first RA configuration when the wireless communication device 615 has re-established a Beam-Tracking Process, BTP.

In some embodiments, the wireless communication device 615 may comprise the processor 1180 or the adapting module 1120 further being configured to restore the first RA configuration when the wireless communication device 615 has re-established a Beam-Tracking Process (BTP) which may also be referred to as a Beam-pair link (BPL).

FIG. 12 is a block diagram depicting a serving network node 611, for performing a method for random access. The network node 611 is serving a wireless communication device 615 and is configured with a first Random Access (RA) configuration. Dashed lines of a box in FIG. 12 indicate that this box is not mandatory and relates to some embodiments only.

The network node 611 is configured to obtain an indication of a failure of a beam-tracking process.

In some embodiments, the network node 611 may comprise a detecting module 1210 or an obtaining module 1240 being configured to obtain an indication of a failure of a beam-tracking process.

The network node 611 is further configured to adapt the RA configuration of the wireless communication device 615 based on the obtained indication. The adapting may comprise switching from the first RA configuration to a second RA configuration having more frequently occurring RA resources than the first RA configuration.

In some embodiments, the network node 611 may comprise an adapting module 1220 or the processor 1280 being configured to adapt the RA configuration of the wireless communication device based on the obtained indication. The adapting may comprise switching from the first RA configuration to a second RA configuration having more frequently occurring RA resources than the first RA configuration.

The network node 611 is further configured to receive, from a wireless communication device 615, a RA message with a RA resource, which RA resource is based on the adapted RA configuration.

In some embodiments, the network node 611 may comprise a receiving module 1230 or the processor 1280 being configured to receive, from a wireless communication device, a RA message with a RA resource, which RA resource is based on the adapted RA configuration.

The network node 611 may further be configured to transmit, to the wireless communication device 615, a control message, which control message indicates a failure of a beam-tracking process.

In some embodiments, the network node 611 may comprise a transmitting module 1250 or the processor 1280 being configured to transmit, to the wireless communication device 615, the control message indicating a failure of a beam-tracking process.

The network node 611 may further be configured to obtain the indication by detecting a loss of a connection towards the network node 611.

In some embodiments, the network node 611 may comprise the detecting module 1210 or the obtaining module 1240 further being configured to obtain the indication by detecting a loss of a connection towards the network node 611.

The network node 611 may further be configured to restore the first RA configuration when a limited time has expired.

In some embodiments, the network node 611 may comprise the adapting module 1220 or the processor 1280 further being configured to restore the first RA configuration when a limited time has expired.

The network node 611 may further be configured to restore the first RA configuration when a Beam-Tracking Process (BTP) has been re-established.

In some embodiments, the network node 611 may comprise the adapting module 1220 or the processor 1280 further being configured to restore the first RA configuration when a Beam-Tracking Process, BTP, has been re-established.

The network node 611 may further be configured to provide, to a neighboring network node 612, an indication to increase the RA resource density.

In some embodiments, the network node 611 may comprise a transmitting module 1250 or the processor 1280 further being configured to provide, to a neighboring network node 612, an indication to increase the RA resource density.

The embodiments herein may be implemented through one or more processors, such as the processor 1180 in the wireless communication device 615 depicted in FIG. 11, and the processor 980 in the first network node 611 depicted in FIG. 12 together with computer program code for performing the functions and actions of the embodiments herein.

The program code mentioned above may also be provided as a computer program product 1191, 1291 for instance in the form of a data carrier carrying computer program code 1192, 1292 for performing the embodiments herein when being loaded into the first network node 611 and the wireless communication device 615. One such carrier may be in the form of a CD ROM disc. It is however feasible with other data carriers such as a memory stick. The computer program code may furthermore be provided as pure program code on a server and downloaded to the first network node 611 and the wireless communication device 615.

Thus, the methods according to the embodiments described herein for the first network node 611 and the wireless communication device 615 may be implemented by means of a computer program product, comprising instructions, i.e., software code portions, which, when executed on at least one processor, cause the at least one processor to carry out the actions described herein, as performed by the first network node 611 and the wireless communication device 615. The computer program product may be stored on a computer-readable storage medium. The computer-readable storage medium, having stored there on the computer program, may comprise the instructions which, when executed on at least one processor, cause the at least one processor to carry out the actions described herein, as performed by the first network node 611 and the wireless communication device 615. In some embodiments, the computer-readable storage medium may be a non-transitory computer-readable storage medium.

The wireless communication device 615 and the first network node 611 may further each comprise a memory 1190, 1290, comprising one or more memory units. The memory 1190, 1290 is arranged to be used to store obtained information such as number of repetitions of a radio block, if the burst mapping is legacy, compact or combined and applications etc. to perform the methods herein when being executed in the first network node 611, and the wireless communication device 615.

Those skilled in the art will also appreciate that the different modules described above may refer to a combination of analog and digital circuits, and/or one or more processors configured with software and/or firmware, e.g. stored in the memory, that when executed by the one or more processors, such as the processors in the first network node 611 and the wireless communication device 615 perform as described above. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

| Abbreviation | Explanation |
| --- | --- |
| 5G | Fifth-Generation Mobile Radio Access |
| BTP | Beam-Tracking Process |
| DL | Downlink |
| eNB | enhanced Node B (i.e., Base Station) |
| LTE | Long-Term Evolution (a.k.a. "4G") |
| MIMO | Multiple Input Multiple Output |
| OFDM | Orthogonal Frequency-Division Multiplexing |
| PBCH | Physical Broadcast Channel |
| PDSCH | Physical Downlink Shared Channel |
| PRACH | Physical Random-Access Channel |
| PSS | Primary Synchronization Signal |
| PUSCH | Physical Uplink Shared Channel |
| RA | Random Access |
| RS | Reference Signal |
| Rx | Receiver |
| SSS | Secondary Synchronization Signal |
| TTI | Transmission-Time Interval |
| Tx | Transmitter |
| UE | User Equipment |
| UL | Uplink |

The invention claimed is:

1. A method performed by a wireless communication device, for performing random access, wherein the wireless communication device is configured with a first Random-Access (RA) configuration, the method comprising:

obtaining an indication of a failure of a beam-tracking process;

adapting a RA configuration of the wireless communication device based on the obtained indication, wherein the adapting comprises switching from the first RA configuration to a second RA configuration having more frequently occurring RA resources in the time domain and/or frequency domain than the first RA configuration; and transmitting, to a network node, a RA message using a RA resource, which RA resource is based on the adapted RA configuration.

2. The method of claim 1, wherein the step of obtaining an indication comprises the wireless communication device detecting a loss of a connection towards the network node.

3. The method of claim 1, wherein the step of obtaining an indication comprises receiving a control message from the network node, which control message indicates a failure of a beam-tracking process.

4. The method of claim 1, wherein the first RA configuration is a proper subset of the second RA configuration.

5. The method of claim 1, wherein the second RA configuration is available for a limited time, whereafter the second RA configuration expires and the wireless communication device restores the first RA configuration.

6. The method of claim 1, wherein the second RA configuration expires and the wireless communication device restores the first RA configuration when the wireless communication device has re-established a Beam-Tracking Process (BTP).

7. A method performed by a serving network node, for performing random access, wherein the network node is configured with a first Random-Access (RA) configuration, the method comprising:

obtaining an indication of a failure of a beam-tracking process, adapting a RA configuration of the wireless communication device
based on the obtained indication, wherein the adapting comprises switching from the first RA configuration to a second RA configuration having more frequently occurring RA resources in the time domain and/or frequency domain than the first RA configuration, and
receiving, from a wireless communication device, a RA message using a RA resource, which RA resource is based on the adapted RA configuration.

8. The method of claim 7, wherein the step of obtaining an indication comprises the network node detecting a loss of a connection towards the wireless communication device.

9. The method of claim 7, wherein the second RA configuration is available for a limited time, whereafter the second RA configuration expires and the network node restores the first RA configuration.

10. The method of claim 7, wherein the second RA configuration expires and the network node restores the first RA configuration when a Beam-Tracking Process (BTP) has been re-established.

11. The method of claim 7, wherein the method further comprises:
providing, to a neighboring network node, an indication to increase the RA resource density.

12. A wireless communication device, for performing a method for random access (RA), the wireless communication device comprising a processor and a memory, said memory containing instructions executable by said processor whereby said wireless communication device is configured to:
obtain an indication of a failure of a beam-tracking process,
adapt a RA configuration of the wireless communication device based on the
obtained indication, wherein the adapting comprises switching from the first RA
configuration to a second RA configuration having more frequently occurring RA resources in the time domain and/or frequency domain than the first RA configuration, and
transmit, to a network node, a RA message using a RA resource, which RA resource is based on the adapted RA configuration.

13. The wireless communication device of claim 12, wherein the wireless communication device is configured to obtain the indication by receiving a control message from the network node, which control message indicates a failure of a beam-tracking process.

14. The wireless communication device of claim 12, wherein the wireless communication device is configured to restore the first RA configuration when a limited time has expired.

15. The wireless communication device of claim 12, wherein the wireless communication device is configured to restore the first RA configuration when the wireless communication device has re-established a Beam-Tracking Process (BTP).

16. A network node, for performing a method for random access (RA), the network node comprising a processor and a memory, said memory containing instructions executable by said processor whereby said network node is configured to:
obtain an indication of a failure of a beam-tracking process,
adapt a RA configuration of the wireless communication device based on the
obtained indication, wherein the adapting comprises switching from the first RA configuration to a second RA configuration having more frequently occurring RA resources in the time domain and/or frequency domain than the first RA configuration, and
receive, from a wireless communication device, a RA message with a RA resource, which RA resource is based on the adapted RA configuration.

17. The network node of claim 16, wherein the network node is configured to obtain the indication by detecting a loss of a connection towards the network node.

18. The network node of claim 16, wherein the network node is configured to restore the first RA configuration when a limited time has expired.

19. The network node of claim 16, wherein the network node is configured to restore the first RA configuration when a Beam-Tracking Process (BTP) has been re-established.

20. The network node of claim 16, wherein the network node is further configured to provide, to a neighboring network node, an indication to increase the RA resource density.

* * * * *